Figure 1:
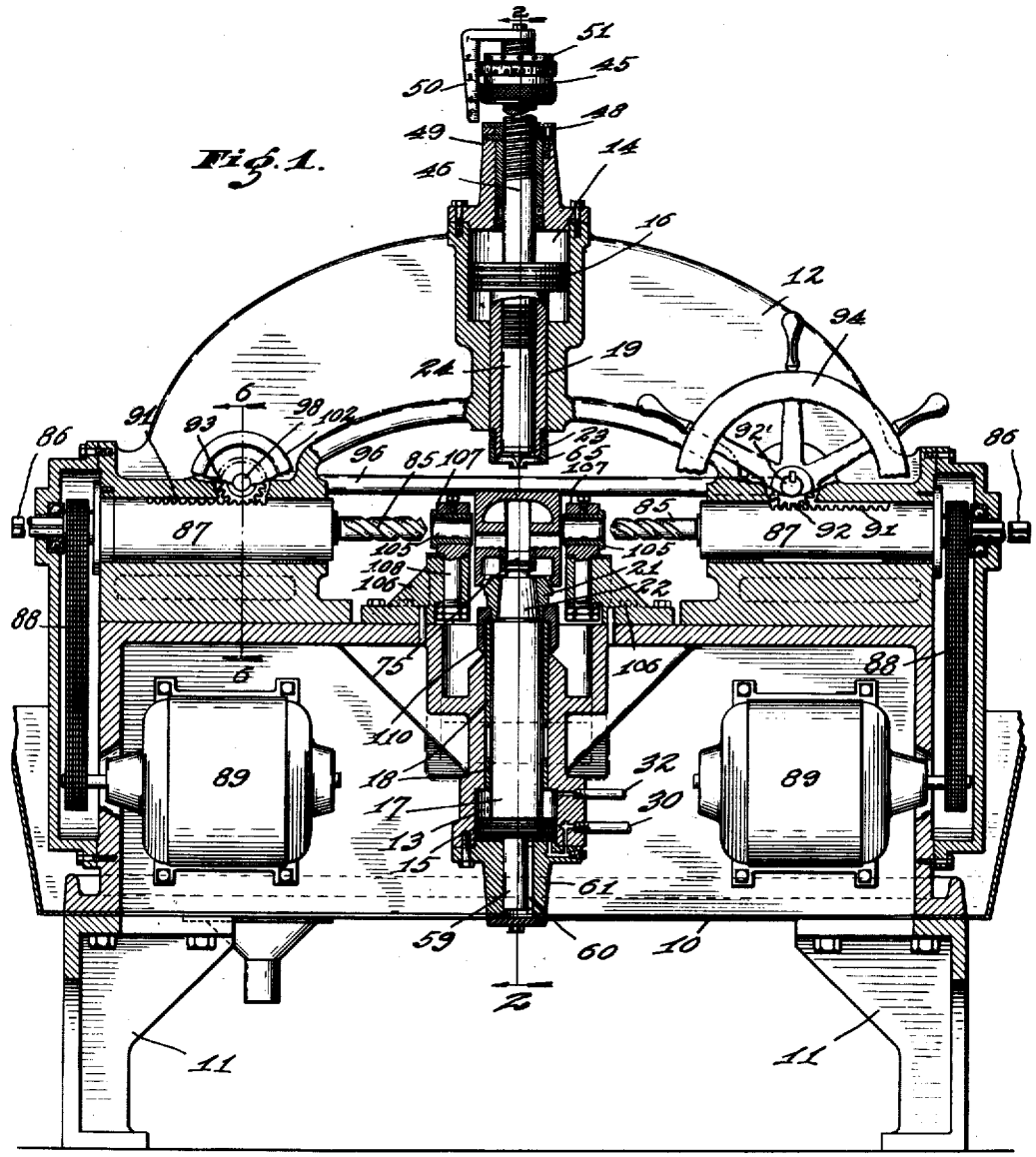

Jan. 31, 1933.  H. A. WAINWRIGHT  1,896,059
DRILLING OR REAMING MACHINE
Filed Sept. 12, 1929  3 Sheets-Sheet 2
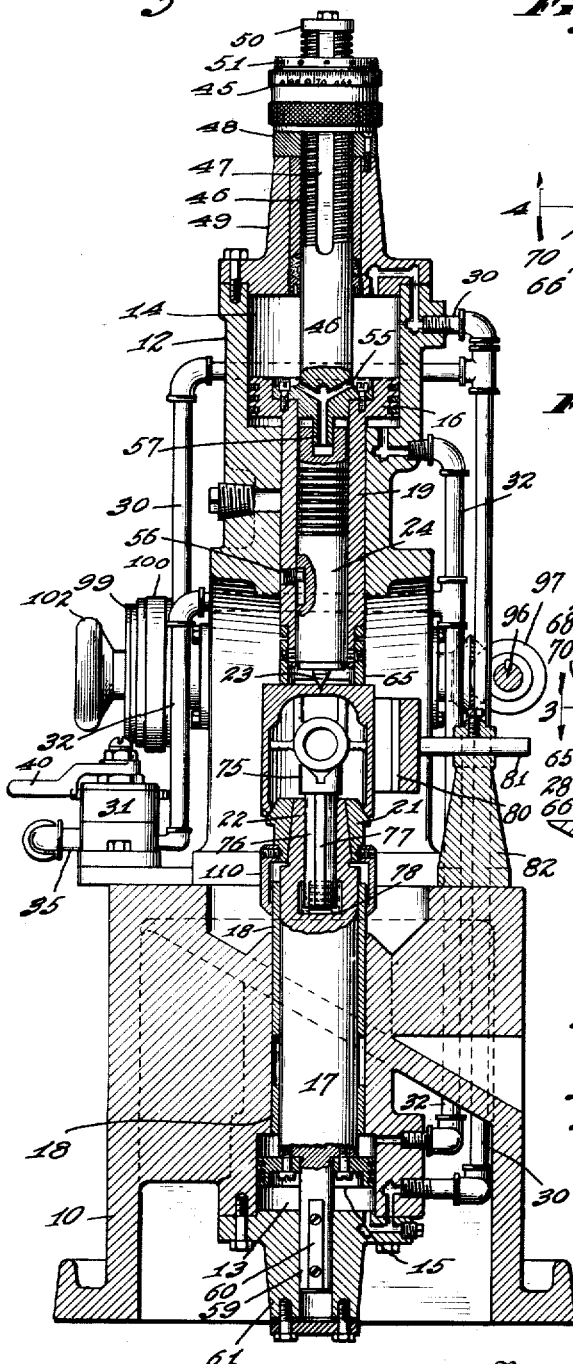
Fig. 2.
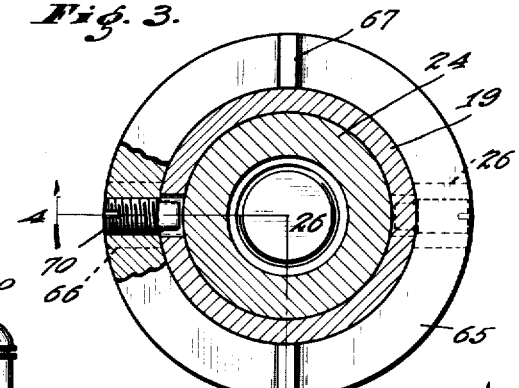
Fig. 3.
Fig. 4.
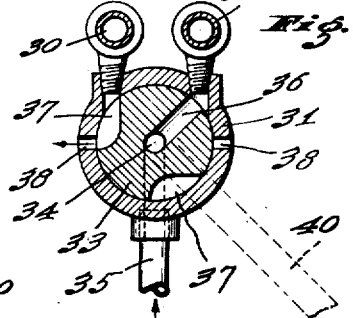
Fig. 5.
Inventor
HARRY A. WAINWRIGHT
By
Attorneys

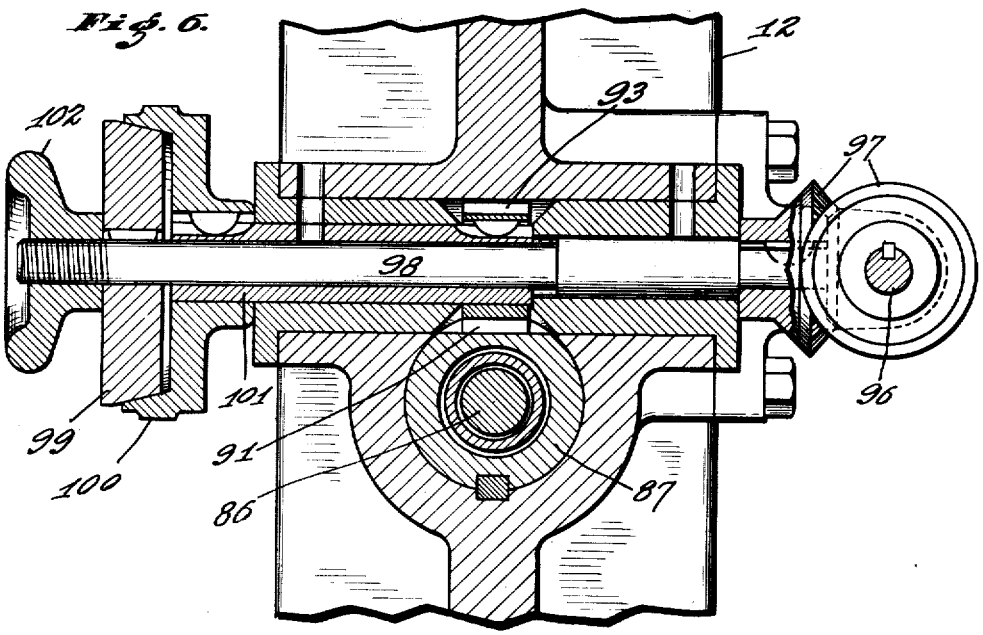
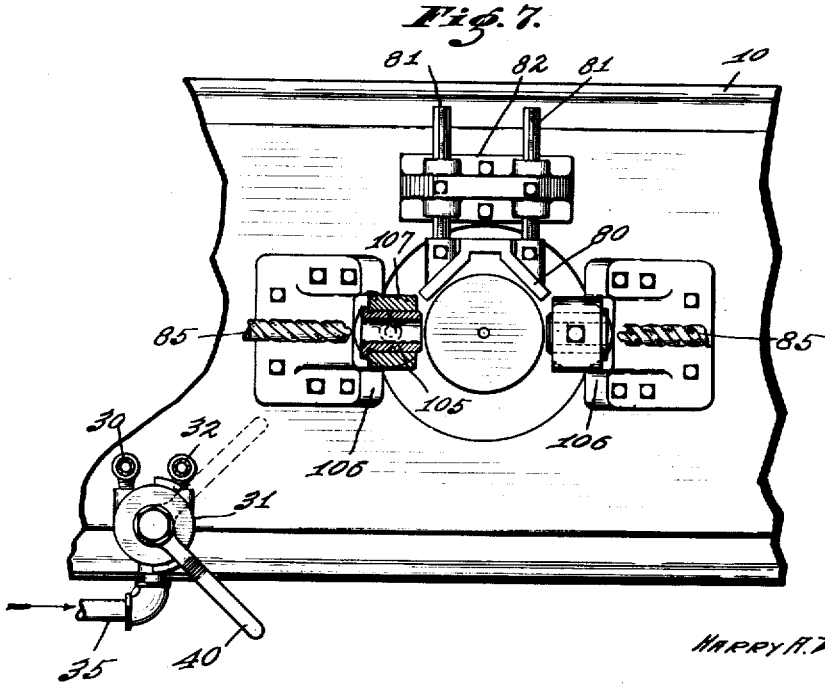

Patented Jan. 31, 1933

1,896,059

UNITED STATES PATENT OFFICE

HARRY A. WAINWRIGHT, OF CONNERSVILLE, INDIANA, ASSIGNOR TO McQUAY-NORRIS MANUFACTURING CO. OF INDIANA, INC., OF CONNERSVILLE, INDIANA, A CORPORATION OF INDIANA

DRILLING OR REAMING MACHINE

Application filed September 12, 1929. Serial No. 392,030.

My invention is primarily concerned with an apparatus for accurately locating and drilling the wrist-pin holes in pistons, although it is not limited to this specific use. The wrist-pin hole in the piston must be accurately perpendicular to the piston axis and must be, within narrow limits, a specified distance from the head or closed end of the piston.

Heretofore, it has been the usual practice to locate and drill the wrist-pin hole in a piston by supporting the piston in a jig or fixture from its exterior finished surfaces. This method is satisfactory in a manufacturing plant engaged in producing pistons of only one size or of a few sizes; but in the case of a factory engaged in the manufacture of replacement pistons it is necessary to provide for the handling of pistons of hundreds of different sizes, and the cost of providing jigs and fixtures for this large number of different piston sizes amounts to thousands of dollars.

Further, when using jigs of the ordinary type in the drilling of wrist-pin holes, the exterior surface of the piston must be accurately finished before the drilling operation. It is sometimes desirable to carry in stock pistons which are finished except for their outer cylindrical surfaces. Such surfaces are merely roughly finished, and the piston is carried in stock in an oversize condition from which it can be quickly reduced to a specified diameter by a light finishing cut. With the exterior surface of the piston only roughly finished, it cannot be used to locate the wrist-pin hole accurately, and it therefore becomes necessary when pistons are stocked in oversize condition either to delay drilling the wrist-pin hole until after the final finishing or to provide the oversize piston with an accurately finished surface which will be cut away when the piston is reduced to its final diameter. Both of these procedures are obviously objectionable.

It is the object of my invention to produce a machine in which the wrist-pin holes of a piston, or analogous holes in a similar article, may be accurately located and drilled rapidly and economically. More specifically it is my object to produce such a machine which will locate the wrist-pin holes from centers in the ends of the piston, which will accurately locate the wrist pin hole along the piston axis, which can easily be altered to accommodate pistons of different sizes, and which will not be subject to wear resulting in objectionable inaccuracy.

In carrying out my invention, I provide a machine having cone-centers adapted to engage previously finished conical surfaces in the piston. These centers are movable toward and away from each other under the control of the operator to clamp a piston between them, and one of the centers has associated with it a positive stop which locates the finished end of the piston accurately at a predetermined distance from bushings that guide the drills which drill the wrist-pin holes.

The accompanying drawings illustrate my invention: Fig. 1 is a vertical section through the machine on a plane through the axis of the drill spindles, some of the parts being shown in elevation; Fig. 2 is a vertical section on the line 2—2 of Fig. 1; Fig. 3 is a horizontal section on the line 3—3 of Fig. 4, showing details of the construction; Fig. 4 is a quarter-section on the line 4—4 of Fig. 3; Fig. 5 is a detail view illustrating the valve which controls movements of the two centers; Fig 6 is a vertical section on the line 6—6 of Fig. 1; and Fig. 7 is a fragmental plan showing the piston and parts adjacent to it.

The piston upon which my machine is designed to operate may be of the trunk or slipper type having a closed end or head and a depending skirt which may be continuous, as in the trunk-type piston, or interrupted, as in the slipper type. Before the piston reaches my machine in the process of production, a center-hole has been drilled in the head, a co-axial conical surface has been provided in the open end of the piston, the head has been finished, and a roughing cut may have been taken over the exterior cylindrical surface of the piston. The center hole in the piston head and the conical surface at the open end of the piston may have been used in finishing the exterior surface of the piston and will be used in any subsequent working of such surfaces.

My drilling machine comprises a base 10, supports 11 therefor, and a yoke 12 which is secured to and extends across the upper surface of the base. The base 10 and yoke 12 are provided with co-axial air cylinders 13 and 14 with which are respectively associated pistons 15 and 16.

Extending upwardly from the piston 15 is a piston rod 17 adapted to be received in a suitable bore in the base 10, which bore may be provided with one or more bushings 18. The piston 16 is provided with a piston rod 19 which extends downwardly and is received within a bore in the yoke 12. The yoke 12 is so located on the base 10 that the piston rods 17 and 19 are accurately co-axial.

On the upper end of the piston rod 17, I mount a center 21 having a conical surface complementary to the conical surface provided in the open end of the piston. Desirably, the center 21 is made removable from the piston rod 17 in order that different centers can be used to accommodate pistons of varying sizes. To this end, the upper end of the piston rod 17 may be provided with a tapered extension 22 and the center 21 with a complementary tapered bore.

The center 23, which is adapted to enter the center-hole in the closed end of a piston is carried by a plunger 24 that is slidably received in an axial bore in the piston rod 19. The center 23 may be provided with a shank 26 that enters a hole in the lower end of the plunger 24, and it may also be provided with an annular flange 27 adapted to receive dowel pins 28 which locate the center on the end of the stem 24.

The lower end of the cylinder 13 and the upper end of the cylinder 14 are connected together and to a pipe 30 which leads to one port of a three-way valve 31. The upper end of the cylinder 13 and the lower end of the cylinder 14 are similarly connected together and to a pipe 32 which leads to another port of the three-way valve 31.

The valve 31 may be of any desired construction, that shown in Fig. 5 including a rotary valving element 33 having an axial passage 34 connected through a pipe 35 with a source of air under pressure. By means of a lateral passage 36, in the rotary element 33, the central passage 34 can be brought into communication with either of the ports connected respectively to the pipes 30 and 32. Auxiliary passages 37 in the valving element 33 serve to connect to either of two exhaust ports 38 that one of the pipes 30 and 32 which is not connected to the source of air under pressure. As shown in Fig. 5, the valve element 33 is in such a position that air under pressure is supplied to the pipe 32 to the upper end of the cylinder 13 and to the lower end of the cylinder 14, thus separating the centers 21 and 23, as shown in Fig. 1. By rotating the valving element 33, as by means of the valve-handle 40, air under pressure may be supplied through the pipe 30 to the lower end of the cylinder 13 and the upper end of the cylinder 14 to cause the centers 21 and 23 to move toward each other and clamp the piston between them, as shown in Fig. 2.

To locate the piston in the desired position axially of itself, I construct the machine so that the clamping pressure exerted on the piston from above is greater than that extending from below, and I provide the piston rod 19 with abutments, one of which cooperates with the piston head and the other of which cooperates with a stationary part to limit downward movement of the piston rod. Constructing the machine so that the downward pressure on the piston rod 19 may predominate over the upward pressure exerted by the piston rod 17 is easily accomplished by making the effective area of the air-cylinder piston 16 greater than that of the other air-cylinder piston 15.

The abutment which limits downward movement of the piston rod 19 is conveniently an adjustable nut 45 mounted on the threaded upper end of a projection 46 which is secured to and extends upward from the piston 16. The extension 46 is provided with a key-way 47 adapted to receive a key carried by a collar 48 secured to a cap 49 which closes the upper end of the cylinder 14. To aid in setting the nut 45 I may provide a scale 50 which is secured to the upper end of the extension 46 and extends downward past the nut 45, the periphery of which may be provided with a series of graduations. A lock nut 51 serves to hold the nut 45 in any desired position of adjustment.

The plunger 24 has a close sliding fit within the bore of the piston rod 19, and the upper end of such bore is connected, as through passages 55 with the cylinder 14 above the piston 16, so that the upper end of the plunger 24 is subjected to air pressure tending to force the center 23 into the center hole in the head of a piston to be drilled. A screw 56 in the wall of the piston rod 19 extends into a longitudinal slot in the plunger 24 to limit relative movement of the plunger and piston rod and to insure that the center 23 will be lifted out of engagement with the piston when the piston rod 19 is elevated.

To prevent relative rotation of the plunger 24 and piston rod 19, I may provide the upper end of the plunger with a transverse slot adapted to receive a tongue 57 on the lower end of the extension 46. This interconnection of the plunger and extension 46, together with the fact that such extension is keyed to the stationary collar, 48, insures that neither the piston rod 19 nor the plunger 24 will rotate about its axis to produce possible inaccuracies. For the same reason, the lower piston rod 17 may be provided with a downward extension 59 having a key 60 slidably received in a key-way in a cap 61 which closes the lower end of the cylinder 13.

The abutment which is carried by the piston rod 19 and which engages the head of a piston being drilled is desirably something other than the center 23, as the center holes in the heads of pistons may vary in depth and so produce inaccuracies in the location of the wrist-pin hole relative to the head end of the piston. The abutment is conveniently in the form of a collar 65 which is loosely received on the lower end of the piston rod 19 and is so construed that it can not exert on the piston being drilled any forces tending to displace such piston from the position determined by the centers 23 and 21. To this end, the collar 65 is provided with diametrically opposite depending feet 66 which engage the head of a piston being drilled. The upper face of the collar 65 is provided in a plane at right angles to that of the feet 66 with two diametrically opposite bosses 67 adapted to engage a shoulder 68 on the piston rod 19.

The collar 65 is held in place on the lower end of the piston rod 19 by means of one or more screws 70 which extend through the collar 65 into holes in the lower end of the piston rod. The ends of the screws 70 which enter the holes in the piston rod are loose in such holes, so that they do not interfere with the ability of the collar 65 to rock slightly on the feet 66 or the bosses 67.

For the purpose of locating a piston to be drilled in the desired position about its longitudinal axis, I may provide on the upper end of the piston rod 17 a yieldingly mounted V-block 75 adapted to receive the wrist-pin bosses of the piston. The V-block 75 is on the upper end of a shank 76 which extends into a central bore in the upper end of the piston rod 17. The shank 76 is freely slidable in the bore which receives it, but it is prevented from rotating relative to the piston rod 17 by means of a key 77.

A coil spring 78, acting between the V-block shank 76 and the piston rod 17 serves to maintain the V-block in a position such as is shown in Fig. 1, where it is at such a height that it will engage the wrist-pin boss of the piston being drilled and support such piston with its lower end out of engagement with the center 21.

When the clamping pressure is applied to the piston being drilled, the spring 78 yields, and the V-block 75 is forced downward to permit the lower end of the piston to engage the center 21, as is shown in Fig. 2.

For the purpose of permitting the operator to locate a piston with the wrist-pin bosses engaging the V-block 75, I may provide an auxiliary locating means in the form of a vertical V-block 80 in rear of the piston. The V-block 80 is adjustably mounted, as by being supported on the inner ends of shanks 81 that are slidably received in a stationary bracket 82 secured to the base 10 of the machine. The V-block 80 is so positioned that there will be a slight clearance (see Fig. 7) between it and the piston when the piston is clamped between the centers 21 and 23.

The purpose of the V-block 80 is merely to facilitate preliminary location of the piston to be drilled; the operator placing such piston against the V-block 80 and lowering it until the wrist-pin bosses engage the horizontal V-block 75. When air under pressure is admitted to the outer ends of the cylinders 13 and 14 and the piston is clamped between the centers 21 and 23, the piston is drawn away from the V-block 80 so that there is no interference with accurate location of the piston.

The drills 85 which drill the wrist-pin holes are carried in the inner ends of spindles 86. The spindles 86 in turn are rotatably mounted in axially slidable sleeves 87, and are connected, as through chains 88 with electric motors 89. I have not shown any details of the spindles 86 and sleeves 87, as these parts may be of any desired construction such as is found in the usual drill-press. The sleeves 87 are conveniently received in guiding bores in the yoke 12.

For the purpose of moving the sleeves axially, I may provide them with rack teeth 91 with which there respectively cooperate pinions 92 and 93. One of these pinions, here shown as the pinion 92, is rigid with a shaft 92′, adapted to be rotated by a hand wheel 94.

Desirably, the sleeves 87 are under a common control, so that they may be moved inwardly or outwardly simultaneously. To this end, the pinions 92 and 93 are operatively interconnected so that rotation of the hand wheel 94 produces a joint rotation of such pinions and effects simultaneous movement of the two sleeves 87.

This is readily accomplished by the provision of a shaft 96 which is connected, as through miter gears (not shown) with the shaft 92′ that carries the hand wheel 94; and this shaft 96 is in turn operatively connected to the pinion 93, preferably through some such mechanism as is illustrated in Fig. 6, such mechanism providing an adjustable connection whereby either spindle may be axially adjusted independently of the other to accommodate drills 85 of different lengths.

The mechanism illustrated in Fig. 6 comprises miter gears 97 which interconnect the shaft 96 and a transverse shaft 98 that extends transversely across and above the sleeve 87. Near its outer end, the shaft 98 carried a friction clutch member 99 which rotates with the shaft 98 and which cooperates with a second clutch member 100 mounted for rotation with a sleeve 101. The pinion 93 is mounted on the inner end of the sleeve 101. A hand-nut 102, screw-threadedly mounted on the outer end of the shaft 98, serves to clamp the two clutch members 99 and 100 together, so that the pinion 93 may be driven from the shaft 98. When the nut 102 is released the driving connection through the clutch members 99 and 100 is broken, and either of the spindles 86 may then be axially adjusted independently of the other. When the desired relative adjustment of the spindles is obtained, the nut 102 is tightened and the sleeves 87 may then be jointly controlled by the hand wheel 94.

For the purpose of supporting the inner ends of the drills 85 in order that the holes which they produce may be accurately located, I provide supports in the form of drill-bushings 105 carried by brackets 106 secured to the base 10 of the machine. Desirably, the bushings 105 are not carried directly by the brackets 106, but instead are mounted in the upper ends of bushing-supports 107 that have vertical shanks 108 rotatably received in the brackets 106. As a result of this mounting, either drill-bushing 105 may be rotated about a vertical axis.

The purpose of this mounting for the drill bushings is to eliminate clearance between the parts which would otherwise be necessary for the removal and insertion of the drills 85 in their associated spindles 86. As the machine is constructed, either of the drills 85 may be driven out of its tapered socket in the end of the spindle 86 into the adjacent bushing 105; and the drill bushing can then be rotated about the axis of the bushing-mounting to permit removal of the drill.

To prevent chips or other foreign matter from falling upon and possibly damaging the inter-engaging faces of the piston rod 17 and its surrounding bushing 18, I may provide a shield 110 in the form of a sleeve which is mounted on the upper end of the piston rod 17 as by being removably attached to the center 21. The sleeve 110 extends downward, and at its lower end closely surrounds the bushing 18, as is clear from Figs. 1 and 2.

In setting up the machine, the yoke 12 is located on the base 10 in such a position that the piston rods 17 and 19 are accurately coaxial, and the yoke and base are then dowelled together. The yoke has been machined in such a manner that the bores which receive the two sleeves 87 are accurately co-axial and accurately perpendicular to the bore that receives the piston rod 19.

In the majority of pistons used at present the wrist-pin hole is coplanar with the piston axis; and for this reason, I prefer to machine the yoke 12 in such a manner that the piston rod 24 and the supporting sleeves 87 for the drill spindles 85 will be coplanar. When it is desired to drill a wrist-pin hole which is not coplanar with the piston axis, I may use special centers 21 and 23 so formed that their conical piston-engaging surfaces are suitably eccentric to the common axis of the piston rods 17 and 19. If this is done, it is doubly important to provide the means described above for preventing rotation of the centers and the parts that carry them.

The brackets 106 which support the drill bushings 105 are also accurately located and dowelled on the base 10. The nut 45 is then adjusted to such a position that the wrist-pin hole produced by the drills 85 will be at the required distance from the head of the piston.

When a piston is not being drilled, the parts of the machine occupy the position illustrated in Fig. 1. The inner ends of the cylinders 13 and 14 are supplied with air under pressure, and the centers 21 and 23 are therefore retracted. The operator inserts a piston in the machine by placing it against the vertical V-block 80 and lowering it until its wrist-pin bosses are received in the horizontal V-block 75 as above set forth. The valve handle 40 is then moved to admit air to the outer ends of the cylinders 13 and 14, thus forcing the centers 21 and 23 towards the piston. Since the air pressure on the air-cylinder piston 16 predominates over that on the piston 15, the stop-nut 45 engages the collar 48, and the sleeve 65 engages the head of the piston to locate the piston axial of itself. The wrist-pin V-block is forced downwardly to compress the spring 78 and the center 21 engages the open end of the piston.

The piston being thus clamped in desired position the operator rotates the hand wheel 94 to feed the drills 85 into the piston to produce the wrist-pin hole. When the hole is drilled, the wheel 94 is rotated in the reverse direction to withdraw the drills, the air control valve handle 40 is then operated to move the centers 21 and 23 outwardly to release the piston, and the drilled piston is removed. If desired, the wrist-pin hole thus produced may be subjected to further finishing operations, such as reaming.

It will be noted that the wrist-pin hole produced in my machine is located solely from the centers in the ends of the piston and from the piston head. The outer cylindrical surface of the piston is not used in the locating operation, and it is therefore unnecessary that this outer surface be accurately finished before the wrist-pin hole is drilled. Further, one of my machines can drill wrist-pin holes in pistons of a variety of sizes, so that it is unnecessary to provide a multiplicity of drill jigs.

While the machine I have described is primarily designed for the drilling of wrist-pin holes in pistons, my invention is not limited to that specific use. In its broader aspects, my invention can in general be employed in any machine adapted to drill transverse holes in an article clamped in definite axial position. The number and arrangement of drill spindles and the form of the clamping members which engage the work may be varied to suit conditions.

I claim as my invention:—

1. A machine for drilling a transverse hole in an object provided with co-axial center holes, comprising axially movable centers co-operating respectively with said center holes, an axially movable stop adapted to engage a transverse surface on the article, co-operating abutments limiting movement of said stop toward the article, means for yieldingly forcing said stop and centers into engagement with the article, said means being arranged to exert on said stop a greater force than is exerted on the center which forces the article into engagement with the stop, and means for driving and supporting a drill in predetermined location relative to the position occupied by said stop when said co-operating abutments engage each other.

2. A machine for drilling the wrist-pin hole in a piston having an open end, a closed end, and a center hole in the closed end, comprising two members located adjacent to the ends of said piston and movable toward and away from it, one of said members being provided with a longitudinal bore, a plunger slidable in said bore, a center mounted on said plunger and adapted to enter the center hole in the piston, said plunger-carrying member being also provided with a stop adapted to engage the closed end of the piston, a center carried by the other of said members and adapted to enter the open end of the piston, two air cylinders and air-cylinder pistons therein, said air-cylinder pistons being connected respectively to said members, the bore in said plunger-carrying member being connected to the associated air-cylinder beyond the piston therein, co-operating abutments limiting movement of the plunger-carrying member toward the piston, control means for supplying air under pressure to the outer or inner ends of the air cylinders to cause the centers to move into or out of engagement with the piston, and drilling means located in predetermined relation to the piston occupied by the plunger-carrying member when at the inner limit of its movement.

3. The invention set forth in claim 2 with the addition that the effective area of the air-cylinder piston associated with the plunger-carrying member is greater than that of the other air-cylinder piston.

4. A machine for drilling the wrist-pin hole in a piston having wrist-pin bosses, an open end, a closed end, and a center hole in the closed end, comprising two members located adjacent to the ends of said piston and movable toward and away from it, one of said members being provided with a longitudinal bore, a plunger slidable in said bore, a center mounted on said plunger and adapted to enter the center hole in the piston, said vided with a stop adapted to engage the closed end of the piston, a center carried by the other of said members and adapted to enter the open end of the piston, a retractible V-block mounted in said last-named member and adapted to engage the wrist-pin bosses of the piston to locate it in desired position about its axis, two air cylinders and air-cylinder pistons therein, said air-cylinder pistons being connected respectively to said members, the bore in said plunger-carrying member being connected to the associated air-cylinder beyond the piston therein, co-operating abutments limiting movement of the plunger-carrying member toward the piston, control means for supplying air under pressure to the outer or inner ends of the air cylinders to cause the centers to move into or out of engagement with the piston, and drilling means located in predetermined relation to the position occupied by said plunger-carrying member when at the inner limit of its movement.

5. The invention set forth in claim 4 with the addition of means adapted to engage the exterior surface of the piston and to guide it to bring the wrist-pin bosses into said V-block.

6. A locating and clamping device for holding an article in predetermined position, comprising a frame, a pair of relatively movable clamping members supported in said frame for clamping the article between them, a pair of cylinders, pistons respectively movable in said cylinders and connected to said clamping members, a movable stop supported in said frame for movement in a direction parallel to that of said clamping members, a third cylinder, a third piston movable in said third cylinder and connected to said stop, means for admitting fluid under pressure to said three cylinders to force said stop and one of said clamping members toward the other clamping member, the piston connected to said latter clamping member having an effective size intermediate that of the other two pistons and the piston connected to said stop having an effective size greater than that of the other two, and means for limiting movement of said stop, said stop being arranged to engage said article to locate it in predetermined position.

7. The inventon set forth in claim 6, with the addition that said three cylinders are concentric, the cylinder associated with the piston of smallest effective size being operatively connected to the piston of largest effective size to be movable therewith.

In witness whereof, I have hereunto set my hand at Indianapolis, Indiana, this 29th day of August, A. D. one thousand nine hundred and twenty-nine.

HARRY A. WAINWRIGHT.

CERTIFICATE OF CORRECTION.

Patent No. 1,896,059.　　　　　　　　　　　　　　January 31, 1933.

HARRY A. WAINWRIGHT.

It is hereby certified that error appears in the printed specification of the above numbered patent requiring correction as follows: Page 5, line 82, claim 4, after "said" insert the words "plunger-carrying member being also pro-"; and that the said Letters Patent should be read with this correction therein that the same may conform to the record of the case in the Patent Office.

Signed and sealed this 25th day of April, A. D. 1933.

(Seal)　　　　　　　　　　　　　　　　　　　　M. J. Moore,
　　　　　　　　　　　　　　　　　　　Acting Commissioner of Patents.

that of the other two, and means for limiting movement of said stop, said stop being arranged to engage said article to locate it in predetermined position.

7. The inventon set forth in claim 6, with the addition that said three cylinders are concentric, the cylinder associated with the piston of smallest effective size being operatively connected to the piston of largest effective size to be movable therewith.

In witness whereof, I have hereunto set my hand at Indianapolis, Indiana, this 29th day of August, A. D. one thousand nine hundred and twenty-nine.

HARRY A. WAINWRIGHT.

CERTIFICATE OF CORRECTION.

Patent No. 1,896,059.　　　　　　　　　　　　　　　January 31, 1933.

HARRY A. WAINWRIGHT.

It is hereby certified that error appears in the printed specification of the above numbered patent requiring correction as follows: Page 5, line 82, claim 4, after "said" insert the words "plunger-carrying member being also pro-"; and that the said Letters Patent should be read with this correction therein that the same may conform to the record of the case in the Patent Office.

Signed and sealed this 25th day of April, A. D. 1933.

(Seal)　　　　　　　　　　　　　　　M. J. Moore,
　　　　　　　　　　　　　　　Acting Commissioner of Patents.

CERTIFICATE OF CORRECTION.

Patent No. 1,896,059. January 31, 1933.

HARRY A. WAINWRIGHT.

It is hereby certified that error appears in the printed specification of the above numbered patent requiring correction as follows: Page 5, line 82, claim 4, after "said" insert the words "plunger-carrying member being also pro-"; and that the said Letters Patent should be read with this correction therein that the same may conform to the record of the case in the Patent Office.

Signed and sealed this 25th day of April, A. D. 1933.

M. J. Moore.
(Seal) Acting Commissioner of Patents.